United States Patent [19]

Park

[11] Patent Number: 5,717,666

[45] Date of Patent: Feb. 10, 1998

[54] APPARATUS FOR ALIGNING OPTICAL AXIS OF OPTICAL PICK-UP

[75] Inventor: Soo-Han Park, Suwon, Rep. of Korea

[73] Assignee: SamSung Electronics Co., Ltd., Kyungki-do, Rep. of Korea

[21] Appl. No.: 628,937

[22] Filed: Apr. 8, 1996

[30] Foreign Application Priority Data

Apr. 7, 1995 [KR] Rep. of Korea ............... 8115/1995

[51] Int. Cl.$^6$ ............................................. G11B 7/095
[52] U.S. Cl. ............................. 369/44.11; 369/44.14; 369/44.22; 369/44.32
[58] Field of Search ......................... 369/44.11, 44.14, 369/44.32, 44.21, 44.22, 44.19, 112, 118, 120

[56] References Cited

U.S. PATENT DOCUMENTS

| 4,837,757 | 6/1989 | Okada et al. | |
|---|---|---|---|
| 4,959,824 | 9/1990 | Ueda et al. | 369/44.14 |
| 4,977,552 | 12/1990 | Gotoh | 369/44.14 |
| 5,060,213 | 10/1991 | Kamisada | |
| 5,072,436 | 12/1991 | Honda | |
| 5,073,884 | 12/1991 | Kobayashi | |
| 5,095,473 | 3/1992 | Gotoh | |
| 5,140,572 | 8/1992 | Kibune et al. | |
| 5,161,040 | 11/1992 | Yokoyama et al. | 369/44.14 |
| 5,175,718 | 12/1992 | Honda | |
| 5,218,586 | 6/1993 | Tadokoro | |

Primary Examiner—Thang V. Tran
Attorney, Agent, or Firm—Robert E. Bushnell, Esq.

[57] ABSTRACT

An optical axis alignment apparatus of an optical pick-up device for measuring and adjusting a shift amount between a central axis of an objective lens and an optical axis of a laser beam emitted from a light source includes a first photodetector positioned to reciprocate along a central axis of the objective lens, for detecting a shift amount of an optical axis of the laser beam with respect to the central axis of the objective lens and for generating a first detection signal; a second photodetector for detecting a distribution of the laser beam emitted from the laser source and for generating a second detection signal; a beam splitter for splitting the laser beam at a predetermined angle to direct the laser beam to said first and said second photodetectors, respectively; a driving mechanism for reciprocating the first photodetector along the central axis of the objective lens; and mechanism for adjusting the position and the angle of the laser source in dependence upon reception of the first and second detection signals.

10 Claims, 10 Drawing Sheets

APPARATUS FOR ALIGNING OPTICAL AXIS OF OPTICAL PICK-UP

CROSS-REFERENCE TO RELATED APPLICATION

This application makes reference to, incorporates the same herein, and claims all benefits accruing under 35 U.S.C. §119 from an application for Apparatus For Aligning Optical Axis Of Optical Pick-up earlier filed in the Korean Industrial Property Office on 7 Apr. 1995 and there duly assigned Ser. No. 8115/1995.

BACKGROUND OF THE INVENTION

1. Technical Field

The present invention relates to an optical axis alignment apparatus for aligning an optical axis of an optical pick-up device so that an optical axis of a laser beam which enters an objective lens is in congruity with a central axis of the objective lens.

2. Background Art

An optical pick-up device of an optical disc memory system is well known in the art which includes an objective lens through which a laser beam is passed to form a small light spot on an optical information recording medium such as an optical disk in order to record, read or erase information to and from the optical disk. In such an optical disk memory system, a unit of information to be recorded on an optical disk is extremely small so that, in order to record and reproduce information to and from an optical disk accurately, it is necessary to control the focusing of an optical pick-up device by aligning an optical axis of a laser beam with a central axis of an objective lens through which the laser beam is irradiated onto an optical disk.

Typically, conventional optical pick-up devices such as those disclosed, for example, in U.S. Pat. No. 5,218,586 for Optical Recording And Reproducing Apparatus issued to Tadokoro, U.S. Pat. No. 5,140,572 for Optical Pickup Device Having Fixed And Movable Optical System issued to Kibune et al., U.S. Pat. No. 5,175,718 for Optical Pickup Apparatus Having Set Positions Of Deflecting Prism And Objective Lens issued to Honda, U.S. Pat. No. 5,073,884 for Tracking Apparatus Having Movable And Stationary Parts issued to Kobayashi, U.S. Pat. No. 5,072,436 for Optical Device For Recording And Reproducing Information issued to Honda, and U.S. Pat. No. 5,060,231 for Separation Type Optical Head issued to Kamisada, are known as separation types in which each device comprises a fixed optical system and a movable optical system. The fixed optical system usually includes a light source, typically a semiconductor laser and a collimating lens. A laser beam emitted from the laser source is collimated by the collimating lens and then propagates toward the movable optical system. The movable optical system comprises a carriage, a reflection prism and an objective lens mounted on the carriage. When the laser beam emitted from the fixed optical system enters into the movable optical system in which the beam is deflected perpendicularly by the reflection prism and converged by the objective lens to a point on the optical disk surface so that information data is recorded on or reproduced from the disk.

In the separation type of optical pick-up device however, the optical axis of the laser beam transmitted from the fixed optical system to the movable optical system in which the laser beam is reflected by the reflection prism to the objective lens is inclined by a small angle with respect to a central axis of the objective lens due to many factors such as, for example, the errors in the mounting position or attitude of the reflection prism or the position of the light source in the fixed optical system emitting the laser beam when assembling the optical pick-up device. Such a misalignment of the optical axis of the laser beam and the central axis of the objective lens causes astigmatism and aberration so that the spot shape of the converged beam irradiated to the surface of the disk is deformed, which degraded the image state of the laser beam and lowers the reliability of signal detection.

Accordingly, to avoid such a problem, it is necessary to align an optical axis of the laser beam with a central axis of the objective lens through which the laser beam is irradiated onto an optical disk during the manufacturing steps of an optical pick-up device so that, after the optical pick-up device is assembled, there will be no misalignment between the optical axis of the laser beam and the central axis of the objective lens. A typical optical axis alignment device for use in a separation-type optical pick-up device usually seeks adjustment of the slope and shift of the optical axis of a laser beam so that the optical axis of the laser beam may be aligned with a central axis of an objective lens. Other optical alignment devices require an additional driving mechanism including a step motor and a motor controller for shifting a photodetector in the optical axis direction instead of shifting the objective lens. Driving the photodetector upward and downward in the optical axis direction of the laser beam, as I have observed, is unsuitable for parallel optical system where the optical axis of the laser beam deviates from the central axis of an objective lens within a preset error range.

SUMMARY OF THE INVENTION

Accordingly, it is therefore an object of the present invention to provide an improved optical axis alignment apparatus.

It is also an object of the invention to provide an optical axis alignment apparatus in which an optical axis of a laser beam emitted from a fixed optical system of an optical pick-up device is aligned with a central axis of an objective lens from a movable optical system.

These and other objects of the present invention can be achieved by an optical axis alignment apparatus for aligning an optical axis of an impinging laser beam with a central axis of an objective lens in a separation-type optical pick-up device which includes a stationary section comprising a light source adapted to emit a light beam and a collimating lens for converting the light beam emitted from the light source into a parallel beam, a beam splitter positioned to split the parallel beam emitted from the stationary section into a first and second beam, and a movable section comprising a carriage adapted to translate in a radial direction of an information recording medium, a deflection prism fixedly mounted on the carriage for deflecting the first beam splitted from the beam splitter, an objective lens fixedly mounted on said carriage for converging the first beam. A first photodetector is mounted on a moveable member of a jig, and positioned spaced-apart from the stationary section and the movable section of the separation-type optical pick-up device to reciprocate along a central axis of the objective lens for detecting a shift amount of an optical axis of the first beam with respect to the central axis of the objective lens and generating a first detection signal. A second photodetector is mounted on the jig, positioned spaced apart from the stationary section and the movable section of the separation-type optical pick-up device, for detecting a distribution of the second beam splitted from the beam splitter and for generating a second detection signal. A driving mechanism is then used to reciprocate the first photodetector along the central axis of the objective lens; an adjustment mechanism is further used to adjust the position and the angle of the light source of said stationary section in dependence upon reception of the first and second detection signals.

It is also preferred in the present invention that the first and the second photodetectors are supported by an unitary member such as, for example, a jig which comprises a moving member adjustable by a pair of adjustment screws. A first adjustment screw is used for shifting the first photodetector in the circumference direction, and a second adjustment screw is used for shifting the first photodetector in the radius direction.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
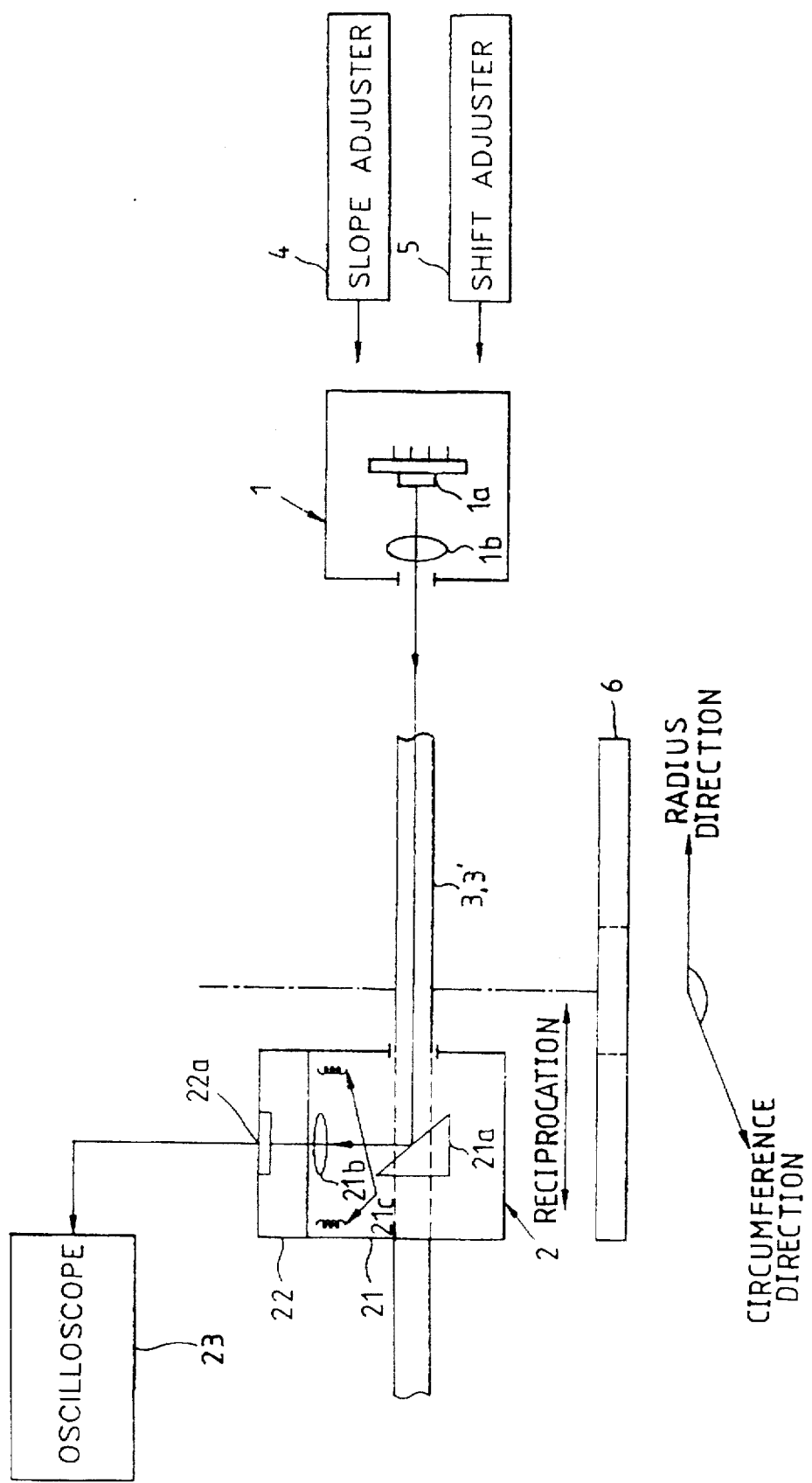
FIG. 1 is a block diagram illustrating a conventional optical axis alignment apparatus for use in an optical pick-up device.

Referring now to the drawings and particularly to FIG. 1, which illustrates a conventional optical axis alignment apparatus for use in a separation-type optical pick-up device comprising a fixed optical system 1 for generating a laser beam and a movable optical system 2 for irradiating the laser beam onto a photodetector 22a for detecting a shift of an optical axis of the laser beam with respect to a central axis of an objective lens 21b. A laser beam emitted from a light source such as a semiconductor laser diode 1a of the fixed optical system 1 is converted to a parallel beam by a collimating lens 1b and is reflected at 90° from a reflection mirror or prism 21a installed in a carriage 21 of the movable optical system 2. The reflected laser beam is then converged by an objective lens 21b to a photodetector 22a positioned in the same central axis as that of an objective lens 21b. The photodetector 22a is fixedly mounted on a jig 22 of the carriage 21 of the movable optical system 2.

Figure 2:
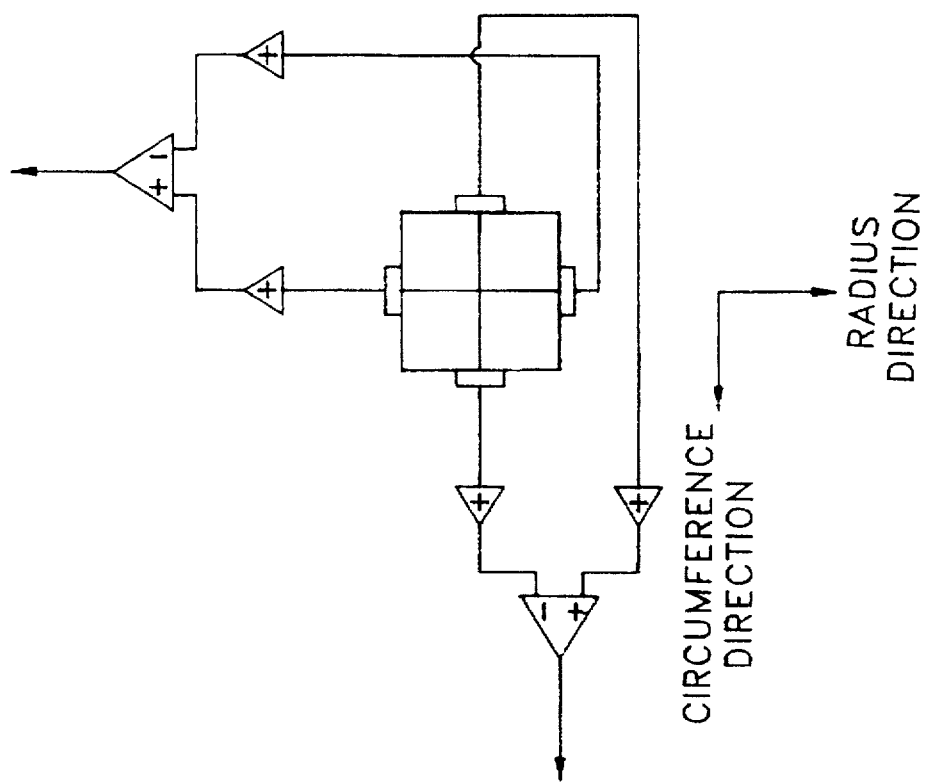
FIG. 2 is a circuit diagram of a photodetector shown in FIG. 1.

FIG. 2 illustrates a typical circuit representing the photodetector 22a used in the conventional optical axis alignment apparatus of FIG. 1. When there is a shift in the optical axis of the laser beam, the photodetector 22a generates a differential signal to an oscilloscope 23. Alignment of the slope and shift of the optical axis is made by adjusting a light emission angle of the semiconductor laser diode 1a by means of a slope adjuster 4 and a shift adjuster 5 in response to the shift amount represented by the differential signal generated from the photodetector 22a via an oscilloscope 23, while the movable optical system 2 reciprocates along two guide rails 3 and 3' in a radius direction of a disc 6 within a preset alignment reference.

Figure 3:
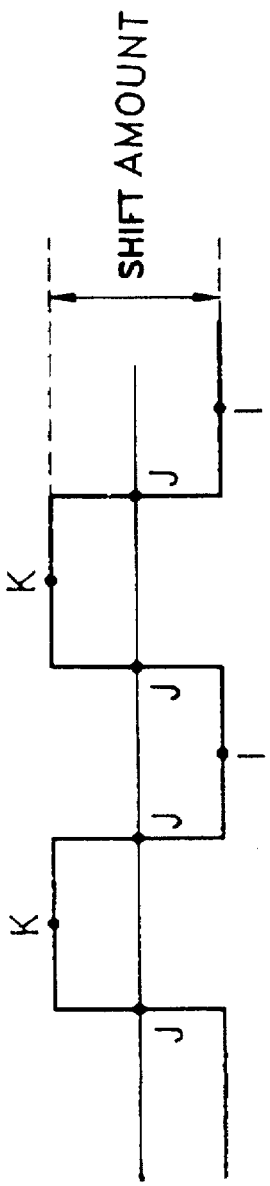
FIGS. 3 and 4 illustrate waveforms of a differential signal of the photodetector according to an optical axis shift in radius and circumference directions, respectively, in the conventional optical axis alignment apparatus of FIG. 1.
Figure 4:
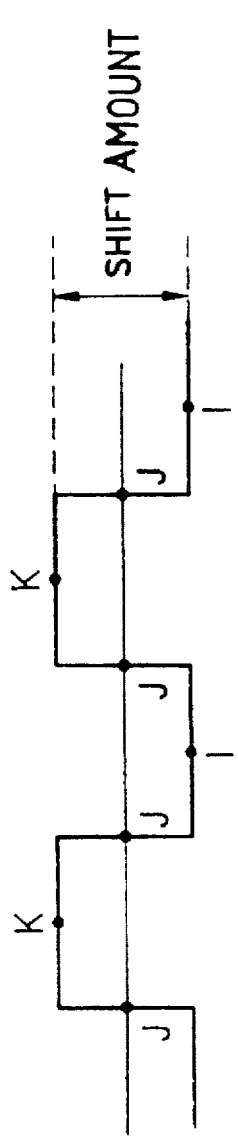
Figure 5:
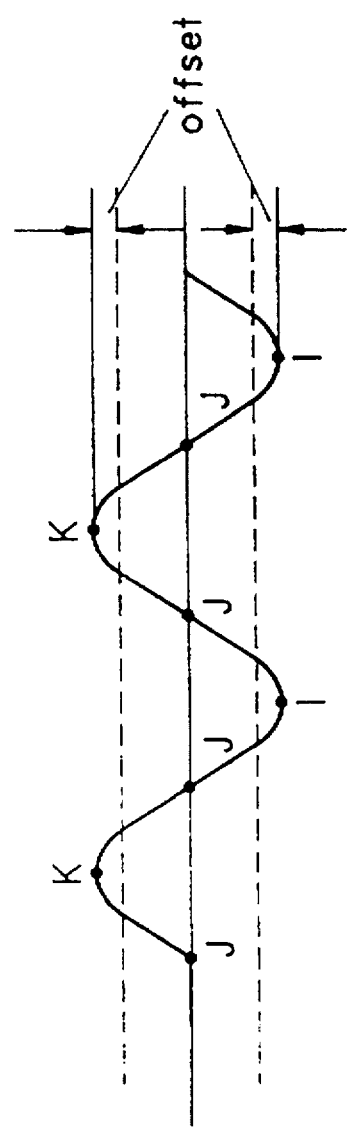
FIG. 5 illustrates an actual waveform of the differential signal of the photodetector according to the optical axis shift in the conventional optical axis alignment apparatus of FIG. 1.
Figure 6:
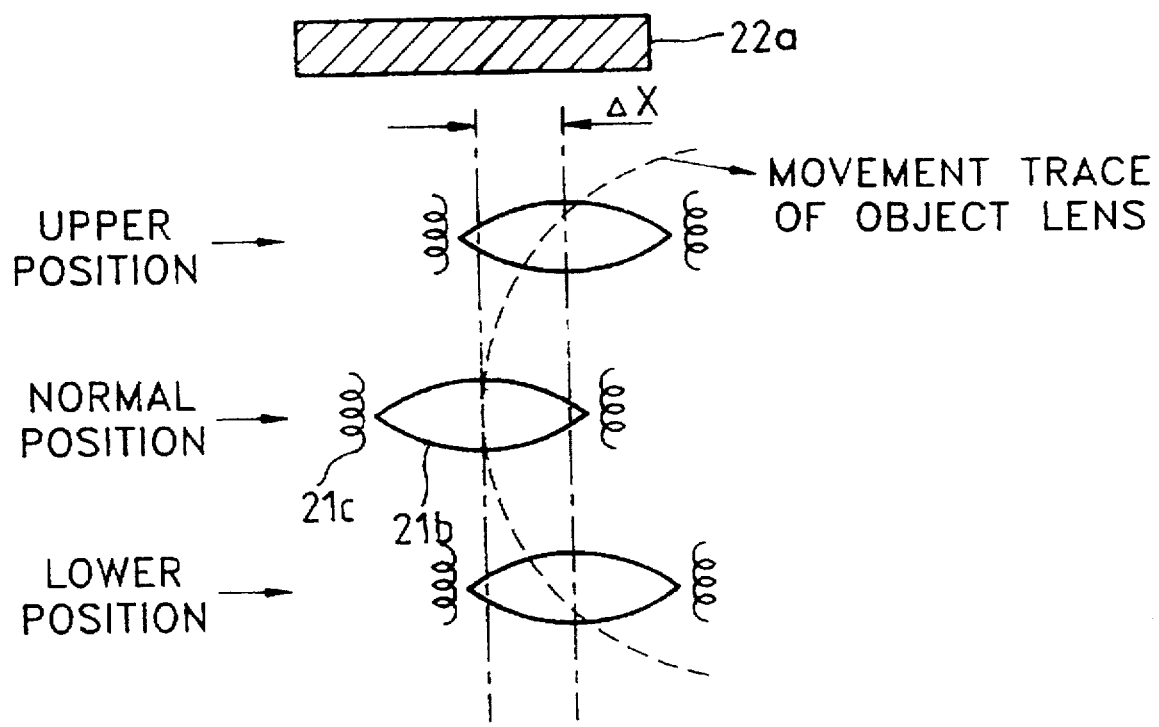
FIG. 6 is a view exhibiting the movement trace of an objective lens in the conventional optical axis alignment apparatus of FIG. 1.

FIGS. 3 and 4 illustrate waveforms of a differential signal of the photodetector 22a according to an optical axis shift in radius and circumference directions, respectively, while FIG. 5 illustrates an actual waveform of the differential signal of the photodetector 22a according to the optical axis shift in the conventional optical axis alignment apparatus of FIG. 1. In FIGS. 3 to 5, positions "I," "J" and "K" respectively represent relative positions of the photodetector 22a with respect to the objective lens 21b. As established in the separation type of optical pick-up device however, error occurring when the objective lens 21b is assembled in the movable optical system 2 becomes an obstacle to an accurate operation. In order to reduce the operational error, the position of the objective lens 21b is adjusted by driving an actuator 21c. When the position of the objective lens 21b is shifted upward and downward by the actuator 21c, however, the waveform of the differential signal generated from the photodetector 22a appears near to a sine wave as shown in FIG. 5, and not a rectangular waveform of FIGS. 3 and 4. This is because, when being moved by the actuator 21c with respect to the photodetector 22a, the objective lens 21b does not move linearly along the optical axis but moves tracing a dotted line while drawing a circle which deviates in one side as shown in FIG. 6. Such a circular movement occurs due to a structure of the actuator 21c, i.e., a fixing member (not shown) of the actuator 21c, to one end of which the objective lens 21b is attached is shaken due to a magnetic field generated by the actuator 21c. Further, as the central axis of the objective lens 21b deviates as much as ΔX, an offset is generated as shown in FIG. 5. The offset value relates to the deviation amount ΔX of the objective lens 21b and serves as a factor in deviating the shift amount from the reference range.

Figure 7:
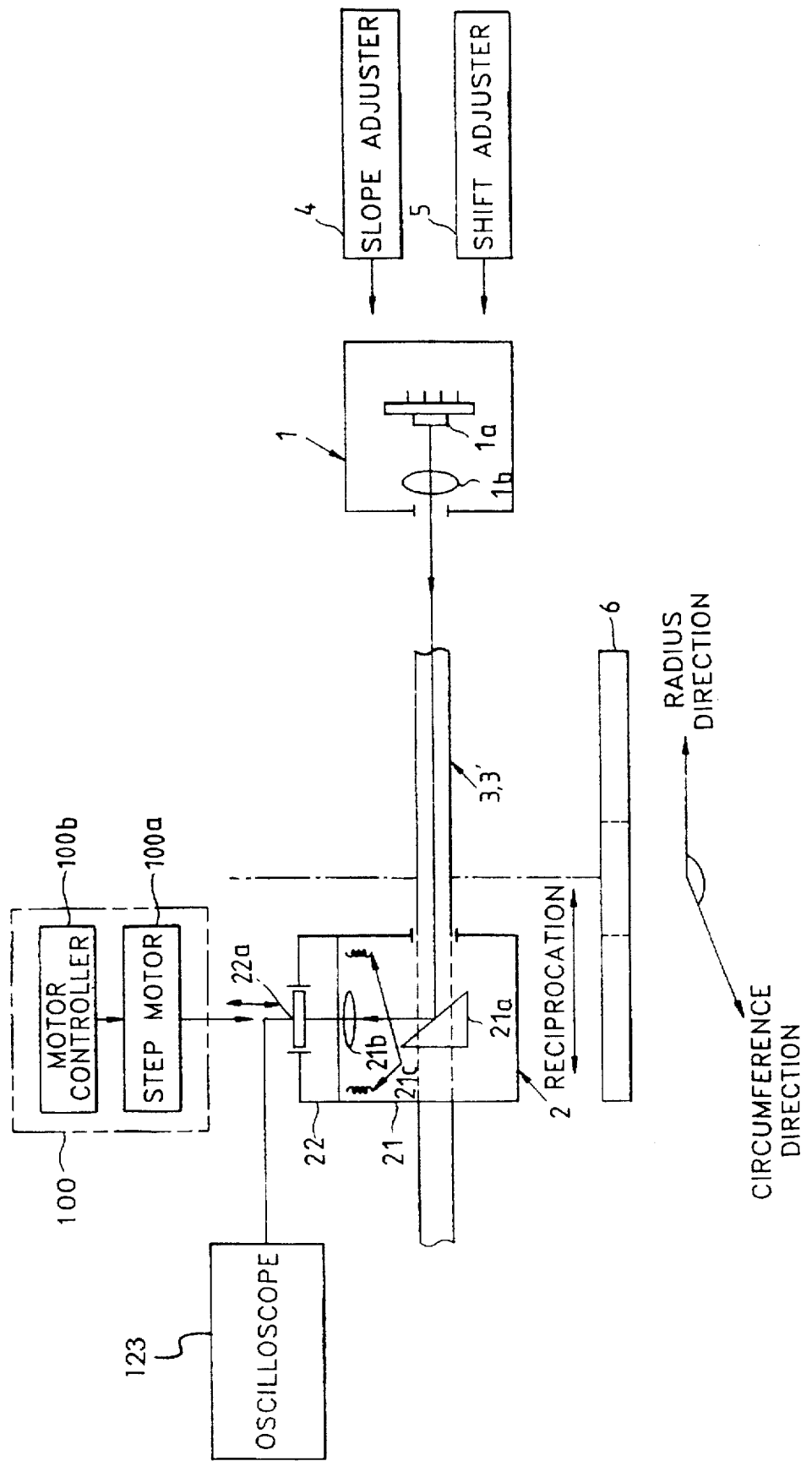
FIG. 7 is a schematic block diagram illustrating another conventional optical axis alignment apparatus for use in an optical pick-up device.
Figure 10:
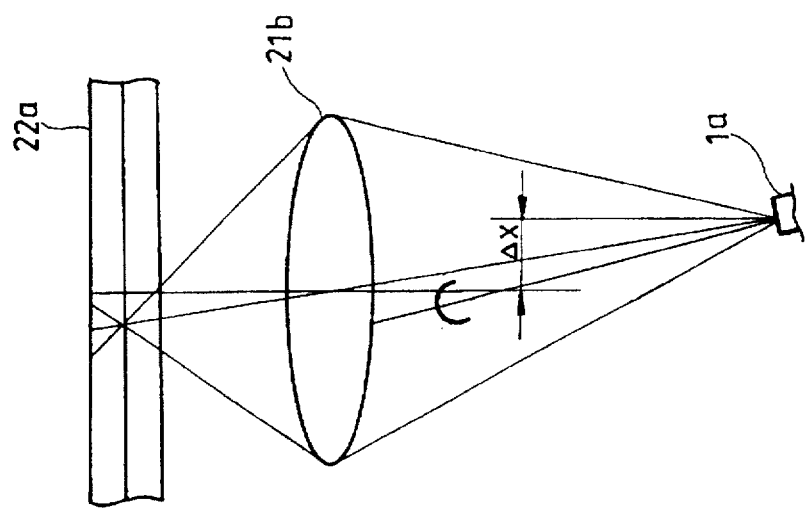
FIGS. 8 to 10 are views for explaining the relationship of the objective lens and the optical axis of a laser beam in infinite and limited optical systems.
Figure 9:
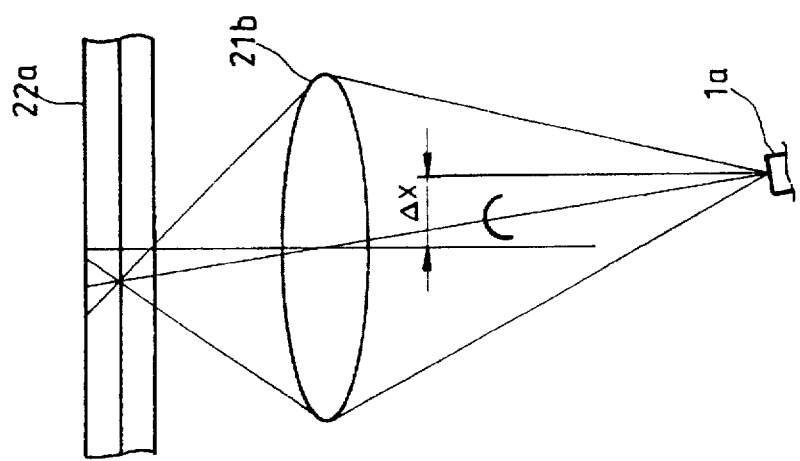
Figure 8:
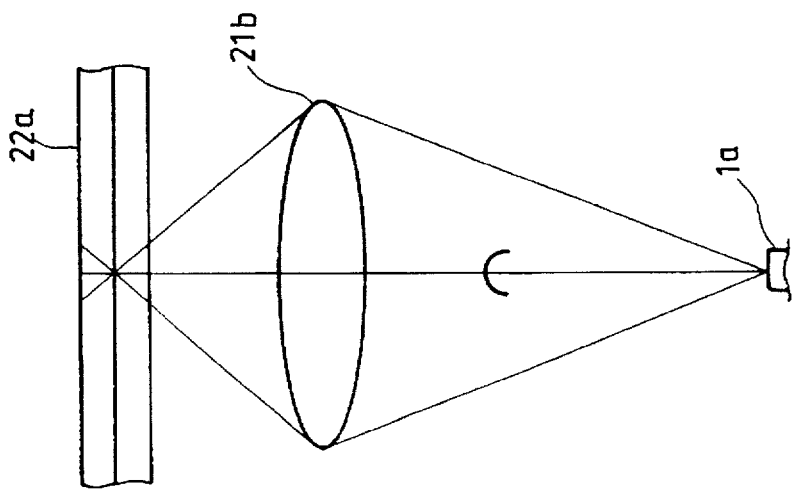

In order to improve such an offset problem, a more recent conventional optical alignment apparatus further includes an additional driving mechanism 100 including a step motor 100a and a motor controller 100b for shifting the photodetector 22a in the optical axis direction instead of shifting the objective lens 21b as shown in FIG. 7. While such a driving mechanism 100 is suitable for use in an infinite parallel optical system where the optical axis of the laser beam emitted from the laser diode 1a is congruous with the central axis of the objective lens 21b as shown in FIG. 8, it has been my observation that this type of optical axis alignment construction is not suitable for a limited parallel optical system where the optical axis deviates from the central axis of an objective lens within a preset error limit range or the divergent beam is input to the objective lens 21b while the optical axis of the laser diode 1a deviates from the central axis of the objective lens 21b as much as ΔX. Moreover, since most optical pick-up devices available are the limited parallel optical systems where the divergent beam is converged to the objective lens, the differential signal of the photodetector 22a can deviate from the reference scope though a light intensity peak position of the optical axis as the divergent beam passes through the center of the objective lens 21b as shown in FIG. 9, and alternatively, when the light intensity peak position is deviated toward one side as shown in FIG. 10.

Figure 11:
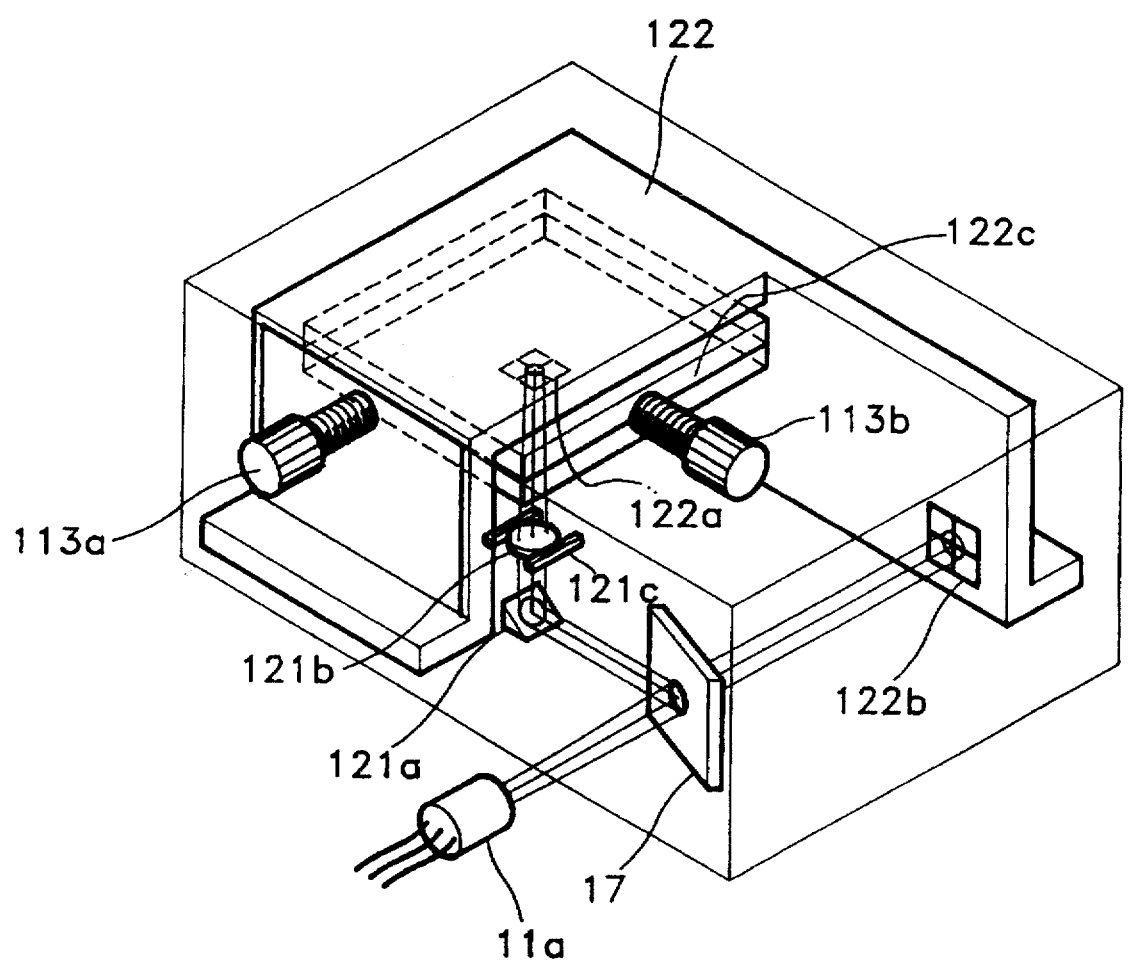
FIG. 11 is a schematic perspective view of an optical axis alignment apparatus constructed according to the principles of the present invention.

Turning now to FIG. 11 which illustrates an improved optical axis alignment apparatus constructed according to the principles of the present invention. The optical axis alignment apparatus constructed according to the present invention is intended to align an optical axis of an impinging laser beam with a central axis of an objective lens of an optical pick-up device. The optical pick-up device as contemplated is a separation-type which includes a stationary optical system comprising a light source adapted to emit a light beam and a collimating lens for converting the light beam emitted from a laser source 11a into a parallel beam, a beam splitter 17 positioned to split the parallel beam into a first and second beam, and a movable optical system comprising a carriage (not shown) adapted to translate in a radial direction of an information recording medium, a deflection prism 121a fixedly mounted on the carriage for deflecting the laser beam splitted from the beam splitter, an objective lens 121c fixedly mounted on the carriage for converging the laser beam onto an optical disk (not shown). However, before the separation-type optical pick-up device is finally assembled for use, the optical axis of an impinging laser beam is aligned with a central axis of the objective lens 121c by the optical axis alignment apparatus as shown in FIG. 11.

Referring back to FIG. 11, the optical axis alignment apparatus constructed according to the present invention includes a jig 122 having a moveable member 122c mounted thereon a first photodetector 122a at the center of its bottom in order to reciprocate along a central axis of the objective lens 121c for detecting a shift amount of an optical axis of the laser beam with respect to the central axis of the objective lens 121c. A second photodetector is mounted on the same jig 122 but spaced apart from the stationary optical system and the movable optical system of the separation-type optical pick-up device, for detecting a distribution of the second beam splitted from the beam splitter 17. A pair of adjusting screws 113a, 113b are mounted to the movable member 122c of the jig 122 to allow adjustment of the position of the first photodetector 122a both in the radius or circumference directions once the initial position of the jig 122 where the photodetectors 122a and 122b are installed is determined. It should be noted here that, after an optical axis of an impinging laser beam is aligned with a central axis of an objective lens by the optical axis alignment apparatus as shown in FIG. 11, an optical disk may then be placed at the position corresponding to the first photodetector 122a in order to operate the optical pick-up device within an optical disk player.

Figure 12:
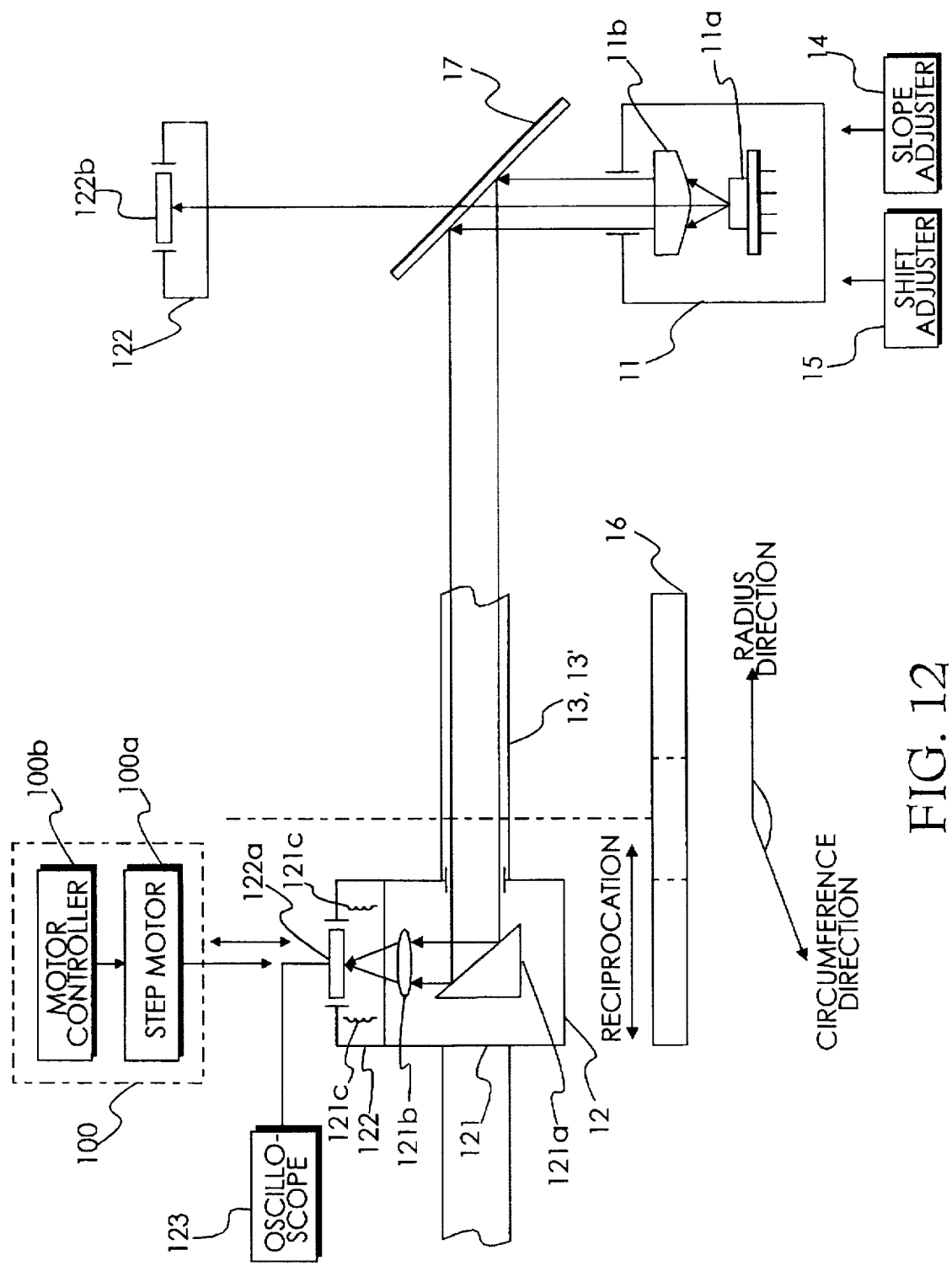
FIG. 12 is a block diagram of the optical axis alignment apparatus of FIG. 11.

FIG. 12 is a block diagram of the optical axis alignment apparatus constructed according to the principles of the present invention for use in a separation-type optical pick-up device. As described above, the optical axis alignment apparatus includes a stationary optical system 11 and a movable optical system 12. The distance between the stationary optical system 11 and the movable optical system 12 is typically adjusted by way of two guide rails 13 and 13' which enables a linear movement of the movable optical system 12. The stationary optical system 11 includes a semiconductor laser diode 11a for emitting a laser beam and a collimating lens 11b for converting the laser beam emitted from the semiconductor laser diode 11a into a parallel beam.

The movable optical system 12 includes a carriage 121 moving in a radius direction of an optical disk 16 along the guide rail 13, a reflection mirror 121a and an objective lens 121b both installed inside the carriage 121. An actuator 121c is also installed inside the carriage 121 for adjusting the movement of the objective lens 121b. A first photodetector 122a as mounted on a movable member of the jig 122 is used for measuring optical axis shift amount from the light intensity of the laser beam passing through the objective lens 121b and installed to be capable of reciprocating along the central axis of the objective lens 121b by a driving portion 100. A second photodetector 122b is mounted on one side of the same jig 122 as shown in FIG. 11 such that the center of a quadrantal plate can be congruous with an optical axis (peak axis) of the laser beam emitted from the laser diode 11a.

Once the first photodetector 122a is mounted on a movable member 122c of the jig 122, its movement can be adjusted both in the radius or circumference directions by means of adjustment screws 113a and 113b as shown in FIG. 11. That is, the adjustment screws 113a and 113b are used to adjust the first photodetector 122a attached at the bottom of the moving member 122c in the circumference direction and the radius direction, respectively.

A slope adjuster 14 is electrically connected to the stationary optical system 11 for adjusting a beam emission angle of the semiconductor laser diode 11a. Similarly, a shift adjuster 15 is electrically connected to the stationary optical system 11 for adjusting horizontal or vertical shift of the laser diode 11a. The driving portion 100 is electrically connected to the movable optical system 12 for reciprocating the first photodetector 122a along the central axis of the objective lens 121b comprises a step motor 100a and a motor controller 100b. The driving portion 100 is used to correct errors occurring during assembly of the objective lens 121b.

In order to align the optical axis of the laser beam so that the optical axis is in congruity with the central axis of the objective lens 121b, the moving member 122c is primarily shifted in the circumference or radius direction by the adjustment screws 113a and 113b of the jig 122 such that the center of the first photodetector 122a attached at the bottom of the moving member 122c can be positioned on the same optical path as the central axis of the objective lens 121b. Next, the first photodetector 122a is shifted by the driving portion 100 toward each of "T", "J" and "K" planes as described in reference to FIGS. 3 and 4 in order to detect deviation amount between the optical axis of the laser beam and the central axis of the objective lens 121b. The emission angle and position of the semiconductor laser diode 11a of the fixed optical system 11 are adjusted by means of the slope adjuster 14 and the shift adjuster 15 in order to maintain the deviation amount within a reference scope.

To assure that any error that occurs when the central axis of the laser beam of the laser diode 11a and the central axis of the objective lens 121b are not congruous with each other as described referring to FIGS. 9 and 10, the second photodetector 122b is installed at the jig 122 where the first photodetector 122a is installed, to detect the incongruity between the center of the laser diode 11a and the central axis of the objective lens 121b, and thus, the above incongruity is adjusted such that the laser beam can be a parallel beam having beam distribution (spot size) within the reference scope. The adjustment is achieved by adjusting the angle and position of the laser diode 11a by the slope and shift adjusters 14 and 15 according to the differential signal detected at the second photodetector 122b having the quadrantal structure.

Figure 13:
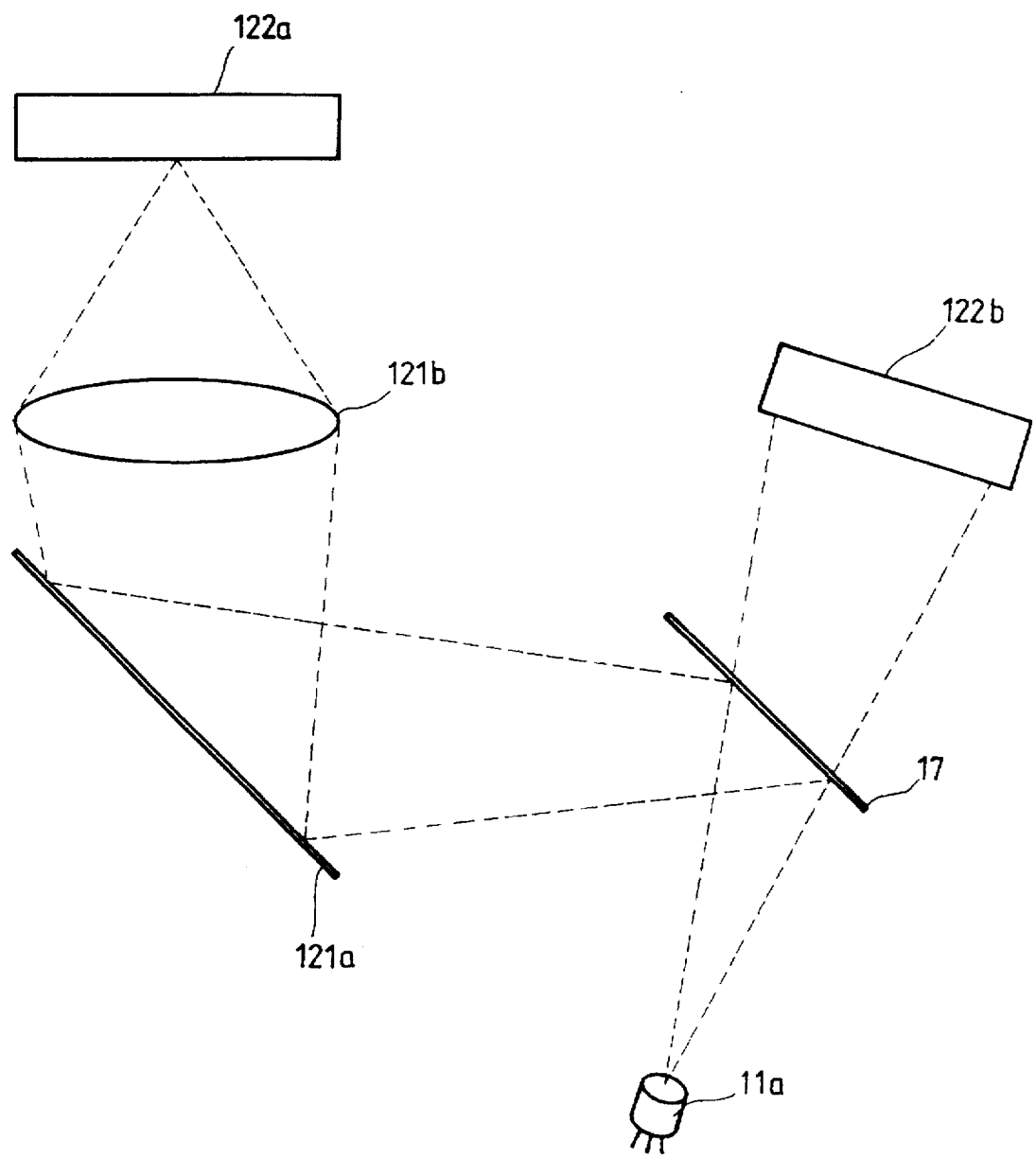
FIG. 13 is a detailed view illustrating path of a laser beam in the optical axis alignment apparatus of FIG. 11.

To detect both shift of the optical axis of the laser beam from the objective lens central axis and distribution variation due to the slope of the laser diode by using the two photodetectors 122a and 122b, the laser beam emitted from the laser diode 11a should be divided using a beam splitter 17 as shown in FIG. 13. That is, the beam splitter 17 divides the laser beam to transfer the divided laser beam to each of the first and second photodetectors 122a and 122b.

Figure 14:
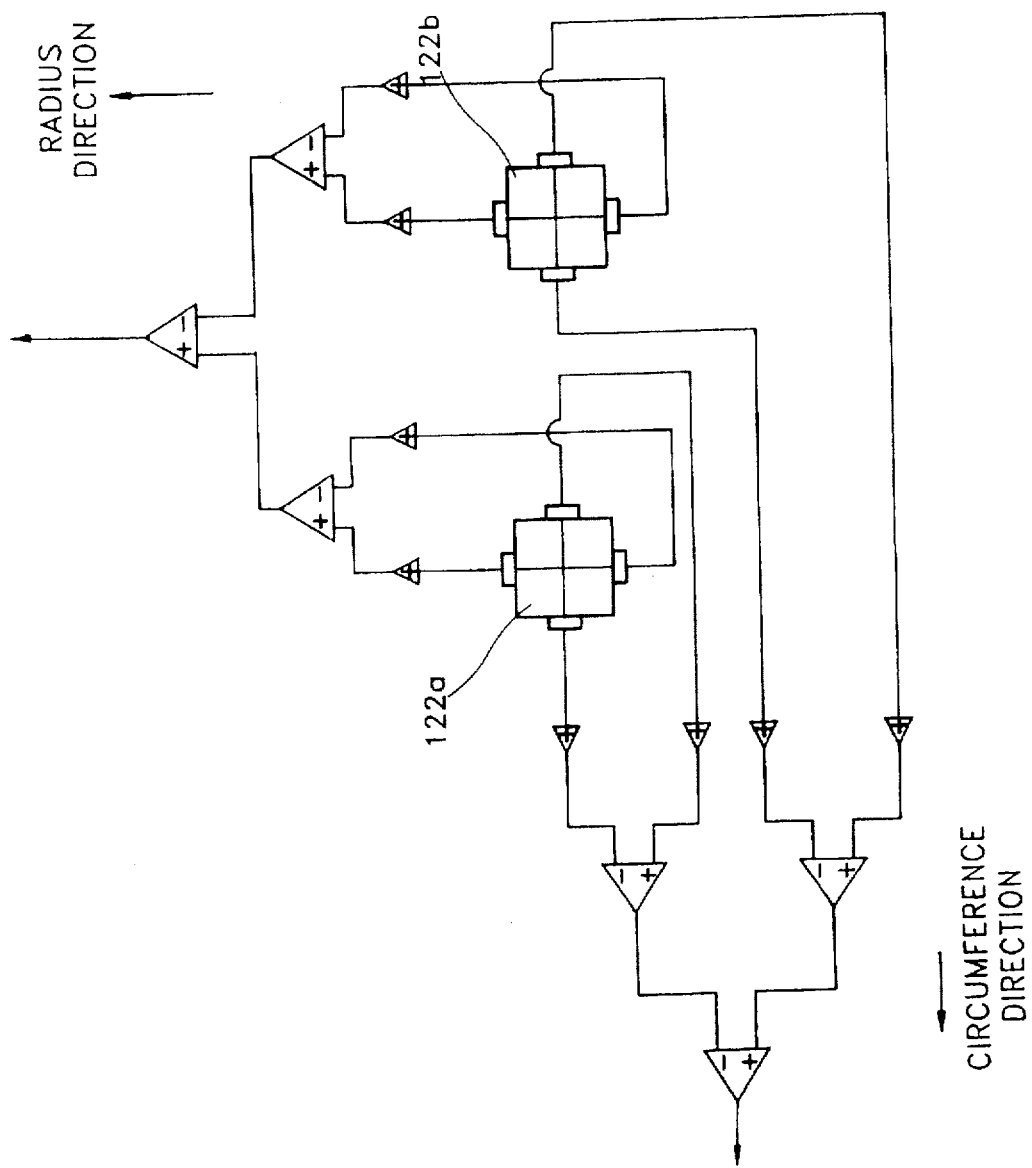
FIG. 14 is a circuit diagram of a photodetector of FIG. 11.

Each of the described shift and distribution variation are detected by the first and second photodetectors 122a and 122b in the radius and circumference directions, respectively, and applied to a photodetector circuit as shown in FIG. 14 so that the optical axis alignment is performed. That is, the shift amount of the objective lens central axis from the laser beam optical axis and angular incongruity between the laser diode and the objective lens central axis which are detected by the first and second photodetectors 122a and 122b in the radius and circumference directions each are differentially amplified at the photodetector circuit of FIG. 14 and provided to the slope adjuster 14, the shift adjuster 15 and the driving portion 100 as an adjustment amount.

As described above, in the optical axis alignment apparatus according to the present invention, the shift of the objective lens central axis from the laser beam optical axis and the angular incongruity between the laser diode and the objective lens central axis each are adjusted by the first and second photodetectors. Thus, a parallel beam can always be input to the objective lens so that an accurate optical axis adjustment is obtained.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An optical axis alignment apparatus for aligning an optical axis of an impinging laser with a central axis of an objective lens of an optical pick-up device, comprising:

an unitary jig having a movable member;

a first photodetector mounted on the movable member, positioned to reciprocate along a central axis of the objective lens, for detecting a shift amount of an optical axis of the laser beam with respect to the central axis of the objective lens and for generating a first detection signal;

a second photodetector mounted on one side of said unitary jig, for detecting a distribution of the laser beam emitted from a laser source and for generating a second detection signal;

a beam splitter for splitting the laser beam at a predetermined angle to direct the laser beam to said first and said second photodetectors, respectively;

driving means for reciprocating said first photodetector along the central axis of the objective lens; and means for adjusting the position and the angle of the laser source in dependence upon reception of said first and second detection signals.

2. The optical axis alignment apparatus of claim 1, wherein said first photodetector has a quadrantal plate structure to detect the shift of the laser beam in circumference and radius directions, respectively.

3. The optical axis alignment apparatus of claim 1, wherein said second photodetector has a quadrantal plate structure to detect the distribution of the laser beam in circumference and radius directions, respectively.

4. The optical axis alignment apparatus of claim 1, wherein said first and said second photodetectors are supported by said unitary jig.

5. The optical axis alignment apparatus of claim 4, wherein said movable member of said unitary jig is supported by:

a first adjustment screw for shifting said first photodetector in the circumference direction; and a second adjustment screw for shifting said first photodetector in the radius direction.

6. An optical axis alignment apparatus, comprising:

an optical pick-up device having a stationary section comprising a light source adapted to emit a light beam and a collimating lens for converting the light beam emitted from the light source into a parallel beam; a beam splitter for splitting the parallel beam into a first and second beam; and a movable section comprising a carriage adapted to translate in a radial direction of an information recording medium, a deflection prism fixedly mounted on said carriage for deflecting the first beam splitted from the beam splitter, an objective lens fixedly mounted on said carriage for converging the first beam;

a first photodetector mounted to reciprocate along a central axis of the objective lens for detecting a shift amount of an optical axis of the first beam with respect to the central axis of the objective lens and generating a first detection signal;

a second photodetector mounted to detect a distribution of the second beam splitted from the beam splitter and for generating a second detection signal;

driving means for reciprocating said first photodetector along the central axis of the objective lens; and means for adjusting the position and the angle of the light source of said optical pick-up device in dependence upon reception of said first and second detection signals.

7. The optical axis alignment apparatus of claim 6, wherein said first photodetector has a quadrantal plate structure to detect the shift of the laser beam in circumference and radius directions, respectively.

8. The optical axis alignment apparatus of claim 6, wherein said second photodetector has a quadrantal plate structure to detect the distribution of the laser beam in circumference and radius directions, respectively.

9. The optical axis alignment apparatus of claim 6, wherein said first and said second photodetectors are supported by an unitary jig structure.

10. The optical axis alignment apparatus of claim 9, wherein said unitary jig structure comprises a movable member adjustable by a first adjustment screw which shifts said first photodetector in the circumference direction, and a second adjustment screw which shifts said first photodetector in the radius direction.

* * * * *